UNITED STATES PATENT OFFICE.

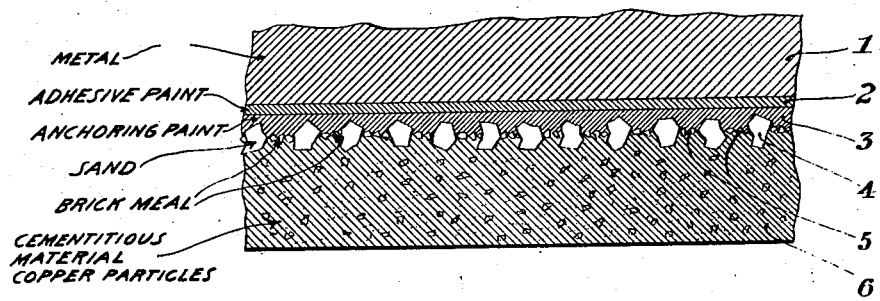

GEORGE D. COLEMAN, DECEASED, LATE OF BUFFALO, NEW YORK, BY NELLIE S. COLEMAN, EXECUTRIX, OF REVERE, MASSACHUSETTS.

PROTECTIVE COATING.

1,318,313.  Specification of Letters Patent.  Patented Oct. 7, 1919.

Application filed November 3, 1916. Serial No. 129,392.

*To all whom it may concern:*

Be it known that GEORGE D. COLEMAN, deceased, late a citizen of the United States and formerly a resident of Buffalo, in the county of Erie and State of New York, did invent certain new and useful Improvements in Protective Coatings; and I, NELLIE S. COLEMAN, of Revere, in the county of Suffolk and State of Massachusetts, his executrix, do herebey declare the following to be a full, clear, and exact description of the invention, such as will enable others skilled in the art to which it appertains to make and use the same.

This invention relates to a coating for the protection of surfaces of metal or wood from the action of the elements or from mechanical injury or abrasion, and particularly for the protection of the bottoms of ship or other sub-aqueous surfaces.

The present inventor has previously proposed to employ hydraulic cement for the protection of such surfaces, and to secure this cementitious material to the surface which is to be protected by the use of an anchoring layer of paint or varnish-like material, together with bonding material in the form of particles partly embedded in the anchoring layer and projecting into, and partly embedded in, the superimposed cementitious material. In Letters Patent of the United States No. 823,205 it is proposed to employ particles of dense solid material, such as sharp sand or lead, as the bonding material in question, while in Letters Patent of the United States No. 937,227 it is proposed to employ as a bonding material, a meal or powder produced by crushing bricks and sifting the product to eliminate dust and coarser particles.

The inventor has discovered that where sand or the like is employed alone or in a bonding material the material of the anchoring layer in which the bonding material is embedded is exposed, for a considerable portion of its surface, between the particles of sand, and, owing to the water-repellent character of the material, there is little if any adhesion between this material, where any so exposed, and the outer layer or coat of cementitious material. It has been found, moreover, that the cementitious material tends to react chemically with the oily or resinous material of the anchoring layer, thus destroying whatever adhesion there may originally be between these layers, and also impairing the integrity of the anchoring layer. On the other hand, where comparatively fine material such as brick-meal is employed as the bonding material, the surface of the anchoring material may be so fully covered as to prevent contact in any substantial degree between the anchoring material and the cementitious material, but in this case the cementitious layer is secured in place wholly or principally by the adhesion to the brick-meal, and this adhesion does not provide as secure a bonding as may be secured by the use of comparatively large particles of bonding material, such as sand, which particles may be so applied as to project substantially beyond the surface of the anchoring layer and thus have an interlocking engagement with the cementitious layer as well as the anchoring layer.

An object of the present invention is to produce a coating in which the bonding material is of such a character, and in which this bonding material is applied to the anchoring layer in such a manner, as to secure the advantages both of entirely covering the surface of the anchoring layer and insulating its surface from that of the cementitious layer, and of providing a firm bond such as may be secured by the use of comparatively large particles of the bonding material which project into and interlock with the cementitious material.

The foregoing object is attained by applying to the surface of the anchoring layer, when it is moist or tacky, sharp sand or crushed quartz, or similar dense material, sufficiently coarse to permit the particles to be only partly embedded in the anchoring material and to project to a substantial degree therefrom, these particles being scattered sparsely over the surface so that they are all properly embedded without interference with each other, and by applying to the surface of the anchoring material, either simultaneously with or subsequently to the application of the sand or equivalent material, comparatively fine particles of bonding material, preferably of a comparatively porous character, such as brick-meal, these finer particles covering and adhering to so much of the surface of the anchoring layer as is exposed between the particles of sand and the like, but not filling up the interstices between the latter. In this way, by the presence of the coarser and finer particles of the bonding material, the surface of the anchoring layer is entirely covered, while at the same time a rough bonding surface similar to that of coarse sand-paper is produced, to which a layer of cementitious protecting material may be firmly attached, both by adhesion and by interlocking with the larger particles.

In said Patents Nos. 823,205 and 937,227, the cementitious layer referred to is composed chiefly or entirely of Portland cement or other hydraulic cement or similar material, but where the protective coating is to be used upon articles submerged in sea-water, a coating consisting chiefly or entirely of hydraulic cement is not effective to prevent the adhesion of barnacles and other growths. The inventor has discovered that copper or other anti-fouling substances may be intimately mingled with the cement, however, and that a coating so produced is particularly effective in preventing the fouling of the bottom of ships. The coating-structure formed as hereinbefore described is particularly suitable for use with an anti-fouling coating comprising cement and anti-fouling matter, and a feature of the present invention resides in the combination of a cementitious anti-fouling layer with an anchoring layer of water-repellent material through the agency of bonding material of the character, and employed in the manner, hereinbefore described.

The accompanying drawing is diagrammatic in character, and it shows in section, on a greatly magnified scale, the approximate arrangement of the various ingredients of a coating formed in accordance with the present invention.

In the drawing the surface to be protected is that of a body 1, such, for example, as a metal plate forming part of the bottom of a ship. After the surface has been thoroughly cleaned and dried, a priming coat 2 of ordinary white-lead paint, or any paint or varnish-like material having a sufficient degree of adhesiveness, may be applied to the surface. A second coat 3 of paint or varnish is then applied, this second coat constituting more particularly the layer of anchoring material hereinbefore referred to. The second coat is preferably quick-drying, and a suitable composition for this purpose may be made by mixing red lead, raw linseed oil, drier and spirits of turpentine, in the proportion of 28 to 30 pounds of red lead to a gallon of the liquid constituents. The drier may be either japan, shellac or a manganese drier. In place of the quick-drying paint just described, other quick-drying paint or varnish may be employed.

While the inner layer of quick-drying paint or varnish is still moist or tacky, the bonding material is applied, preferably by spraying with air under low pressure. The sand and the brick-meal may be applied separately, but they are preferably mixed in suitable proportions and applied together. A proportion of one part, by bulk, of brick-meal to four parts of sand or ground quartz has been found suitable for the purpose. After the application of the bonding material the anchoring layer 3 is permitted to dry and harden, and the cementitious material is then applied to produce the outer or protective layer 6.

For the best results, the particles 4 of sand or quartz should be much larger than the particles 5 of brick-meal or the like, as shown in the drawings, so that the smaller particles will not substantially fill the spaces between the projecting portions of the sand particles. It has been found that sand graded by a screen 10 to 14 meshes to the inch may be combined with brick-meal of a fineness of 30 to 40 mesh, to produce a satisfactory embodiment of the invention.

The exact composition of the cementitious layer is not an essential feature of the present invention, and the anti-fouling substance embedded in it may have the form of metallic copper, copper-compounds, arsenic, or other suitable substances. A suitable compound for the purpose may be stated, for example, to consist of:—

| | |
|---|---|
| Hydraulic cement | 100 parts by weight |
| Sharp sand or ground quartz | 50 " " " |
| Paraffin-wax | 6 " " " |
| Acetate or sulfate of copper | 6 " " " |
| Calcium hydroxid | 8 " " " |
| Mineral fiber | 8 " " " |
| Finely-divided metallic-copper | 119 " " " |

These ingredients are to be intimately mixed, and reduced to a plastic condition by the addition of water or of an emulsion of water with 20 per cent., more or less, of heavy mineral oil. The anti-fouling compound comprising hydraulic cement and cupric material, broadly or in the specific form just set forth, is disclosed and claimed in a co-pending application Serial No. 129,393, filed of even date herewith, on behalf of the same inventor, and is not therefore claimed as a part of the present invention.

The invention is not limited to the embodiment thereof hereinbefore described and illustrated in the accompanying drawing, but may be embodied in various other forms within the scope of the following claims.

The invention claimed is:—

1. A protective coating comprising a layer of paint; a bonding layer comprising comparatively large particles of solid matter sparsely distributed over, and partly embedded in, the paint before the drying of the latter, and comparatively fine granular material adherent to, and substantially covering, the surface of the paint between said large particles; and a protective layer of material having a base of hydraulic cement, applied to and anchored by the bonding layer.

2. A protective coating comprising a layer of paint; sand distributed sparsely over and partly embedded in the surface of the paint; brick-meal covering and adherent to the surface of the paint between the particles of sand; and a copper-bearing layer of hydraulic cement covering and adherent to the sand and the brick-meal.

3. A protective coating comprising a layer of paint; comparatively coarse particles of dense mineral matter distributed sparsely over and partly embedded in the surface of the paint; comparatively fine particles of porous mineral matter covering and adherent to the surface of the paint between the coarse particles; and a layer of copper-bearing material covering and adherent to the particles of mineral matter.

4. A protective coating comprising a priming-coat of paint; a coat of quick-drying paint spread on the priming-coat; sand and brick-meal covering and adherent to the quick-drying paint; and a layer of material, comprising hydraulic cement and copper, laid upon and adherent to the sand and brick-meal.

NELLIE S. COLEMAN,
*Executrix of George D. Coleman, deceased.*